(12) United States Patent  (10) Patent No.: US 7,491,253 B2
Wilson  (45) Date of Patent: Feb. 17, 2009

(54) ENGINE INTAKE SYSTEM WITH ACCESSIBLE, INTERCHANGEABLE AIR FILTERS

(75) Inventor: Joseph Wilson, Florissant, MO (US)

(73) Assignee: Aerospace Filtrations Systems, Inc., St. Charles, MO (US)

(*) Notice: Subject to any disclaimer, the term of this patent is extended or adjusted under 35 U.S.C. 154(b) by 587 days.

(21) Appl. No.: 11/141,630

(22) Filed: May 31, 2005

(65) Prior Publication Data

US 2009/0007528 A1 Jan. 8, 2009

(51) Int. Cl.
*F02C 7/052* (2006.01)
*B64D 33/02* (2006.01)

(52) U.S. Cl. .............. 55/306; 55/337; 55/347; 55/348; 55/456; 55/502; 55/385.1; 55/505; 123/198 E; 60/39.092; 181/276; 244/53 B

(58) Field of Classification Search ............ 55/306, 55/337, 347, 348, 456, 502, 385.1, 505; 123/198 E; 60/39.092; 181/276; 244/53 B
See application file for complete search history.

(56) References Cited

U.S. PATENT DOCUMENTS 2,405,102 A * 7/1946 Vokes .......................... 55/306
3,421,296 A    1/1969 Beurer, Sr.
3,449,891 A    6/1969 Shohet et al.
3,483,676 A *  12/1969 Sargisson .................... 55/306
3,572,028 A *  3/1971 Taylor ..................... 60/39.092
3,811,254 A    5/1974 Amelio
4,004,760 A *  1/1977 Ando et al. ................ 244/53 B
4,129,429 A    12/1978 Humbert, Jr. et al.
4,158,449 A    6/1979 Sun et al.

(Continued)

FOREIGN PATENT DOCUMENTS

WO    WO 97/49608    12/1997

OTHER PUBLICATIONS

Bell 206/OH58A Aerofilter System, FDC/aerofilter, webpage www.fdcaerofilter.com, printed Mar. 22, 2005.

(Continued)

*Primary Examiner*—Jason M Greene
*Assistant Examiner*—Minh-Chau T Pham
(74) *Attorney, Agent, or Firm*—Armstrong Teasdale LLP

(57) ABSTRACT

An air induction system for an engine to remove contaminants from intake air prior to delivery to the engine. The system includes a filtering unit having barrier filter panels attachable to a mounting frame. The filter panels are interchangeably usable. A juncture between first and second filter panels and the mounting frame is located at a region of relatively lower quantity of intake air flow. The juncture includes lugs on the filter panels which facilitate interchangeability. An opening above the filtering unit permits easy installation and removal of filter panels.

25 Claims, 11 Drawing Sheets

U.S. PATENT DOCUMENTS

| | | | |
|---|---|---|---|
| 4,291,530 A | 9/1981 | Ballard | |
| 4,502,875 A | 3/1985 | Ballard | |
| 4,897,097 A | 1/1990 | Yamamura | |
| 5,139,545 A | 8/1992 | Mann | |
| 5,662,292 A | 9/1997 | Greene et al. | |
| 5,697,394 A | 12/1997 | Smith et al. | |
| 6,138,950 A * | 10/2000 | Wainfan et al. | 244/53 B |
| 6,595,742 B2 | 7/2003 | Scimone | |
| 6,824,582 B2 | 11/2004 | Wilson | |
| 7,150,431 B2 | 12/2006 | Dennis | |
| 7,192,462 B2 * | 3/2007 | Stelzer et al. | 55/306 |
| 7,217,184 B2 | 5/2007 | Dennis | |

OTHER PUBLICATIONS

Bell 206L Aerofilter System, FDC/aerofilter, webpage www.fdcaerofilter.com, printed Mar. 22, 2005.

International Search Report and Written Opinion for PCT/IB2006/021110 dated Jun. 26, 2008, 17 pages.

\* cited by examiner

ENGINE INTAKE SYSTEM WITH ACCESSIBLE, INTERCHANGEABLE AIR FILTERS

BACKGROUND OF THE INVENTION

This invention relates generally to air intakes for engines, and in particular to a system for readily installing and mounting barrier filters across an intake passage to protect an aircraft engine.

An engine for aircraft propulsion requires intake air that is free from contaminants to provide for efficient combustion and avoid internal damage. The compressor and turbine are designed with small tolerances between moving parts which maximize efficiency, but which also increase vulnerability to damage from small foreign particles. Contamination of intake air, even in a small amount, causes premature wear on engine components, increases maintenance costs, and degrades operational reliability. Unfortunately, aircraft are exposed to contaminants when operating at low altitudes where air is frequently contaminated with material from the ground, such as sand and dust. That problem is aggravated for helicopters due to rotor downwash and prolonged low-altitude operation.

Systems which remove foreign particles from intake flow have been developed to protect the engine from damage. These systems include a contaminant separator positioned in advance of the engine. Unfortunately, it is frequently difficult to access the contaminant separator for periodic maintenance tasks. Typically, the intake passage and adjacent area have tightly limited space constraints which restrict accessibility. The separator may have a relatively large size extending across an entire width of the passage so as to receive all intake air. Removal or replacement of the separator requires substantial disassembly and subsequent re-assembly of surrounding parts. These steps are inefficient and degrade operational readiness. Further, some systems fail to provide an auxiliary or bypass flow path enabling continued operation of the engine with an adequate quantity of air should the separator become plugged with contaminants.

SUMMARY OF THE INVENTION

In general, a filtering unit of the present invention is configured for placement in a passage of an engine air induction system to receive intake air and remove contaminants from the intake air. The filtering unit comprises a mounting frame securable in the passage, the mounting frame defining first and second mounting locations. A first barrier filter panel is attachable to the mounting frame at the first mounting location, the first filter having a porous filter media. A second barrier filter panel is attachable to the mounting frame at the second location, the second filter having a porous filter media. The first and second filter panels are interchangeably usable. The filter panels are substantially identical in shape and size such that each is attachable to the mounting frame at either of the first or second mounting location.

In another aspect, an engine air induction system of the present invention receives intake air and removes contaminants from the intake air. The air induction system comprises a body having a hollow interior with an entryway for receiving intake air and comprising a passage for delivery of intake air toward the engine. A filtering unit is in the body such that intake air in the interior of the body flows therethrough. The filtering unit includes a mounting frame secured in the body and at least two barrier filter panels removably attached to the mounting frame. The body has an opening for installation or removal of the filter panels. The opening is located generally above the filtering unit, and configured such that a person may reach through the opening and manually detach either of the filter panels from the mounting frame and remove the filter panel through the opening for maintenance or replacement, and then insert the filter panel through the opening and manually reach through the opening to attach the filter panel to the mounting frame.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
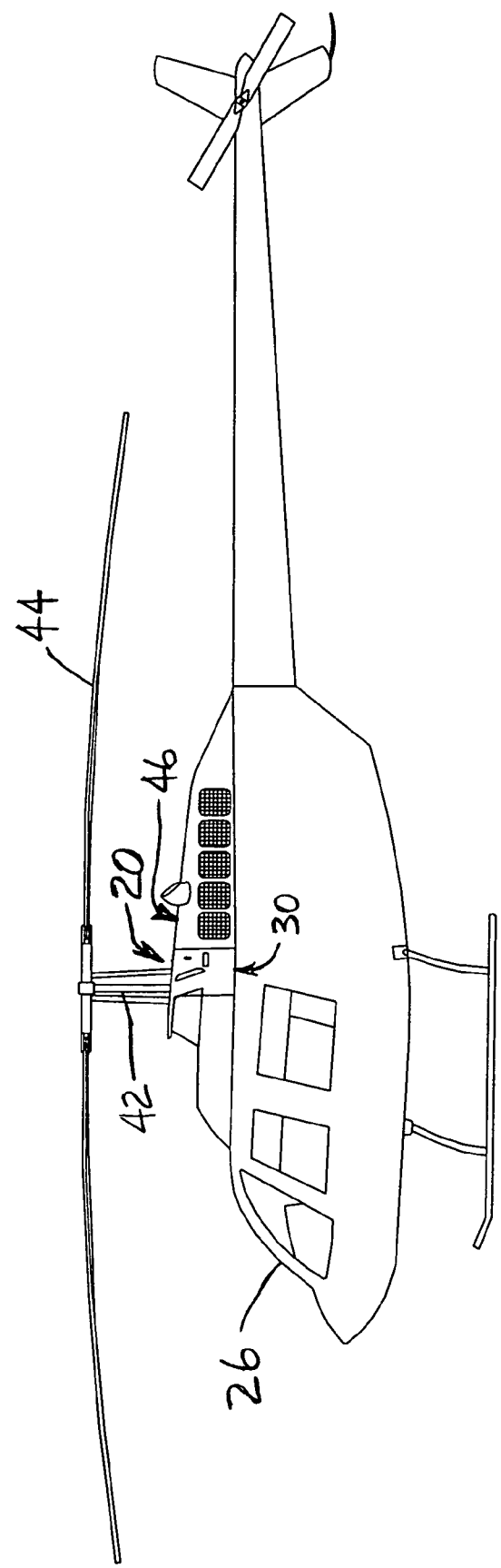
FIG. 1 is a side elevation of a helicopter which incorporates an air induction system according to the present invention.
Figure 2:
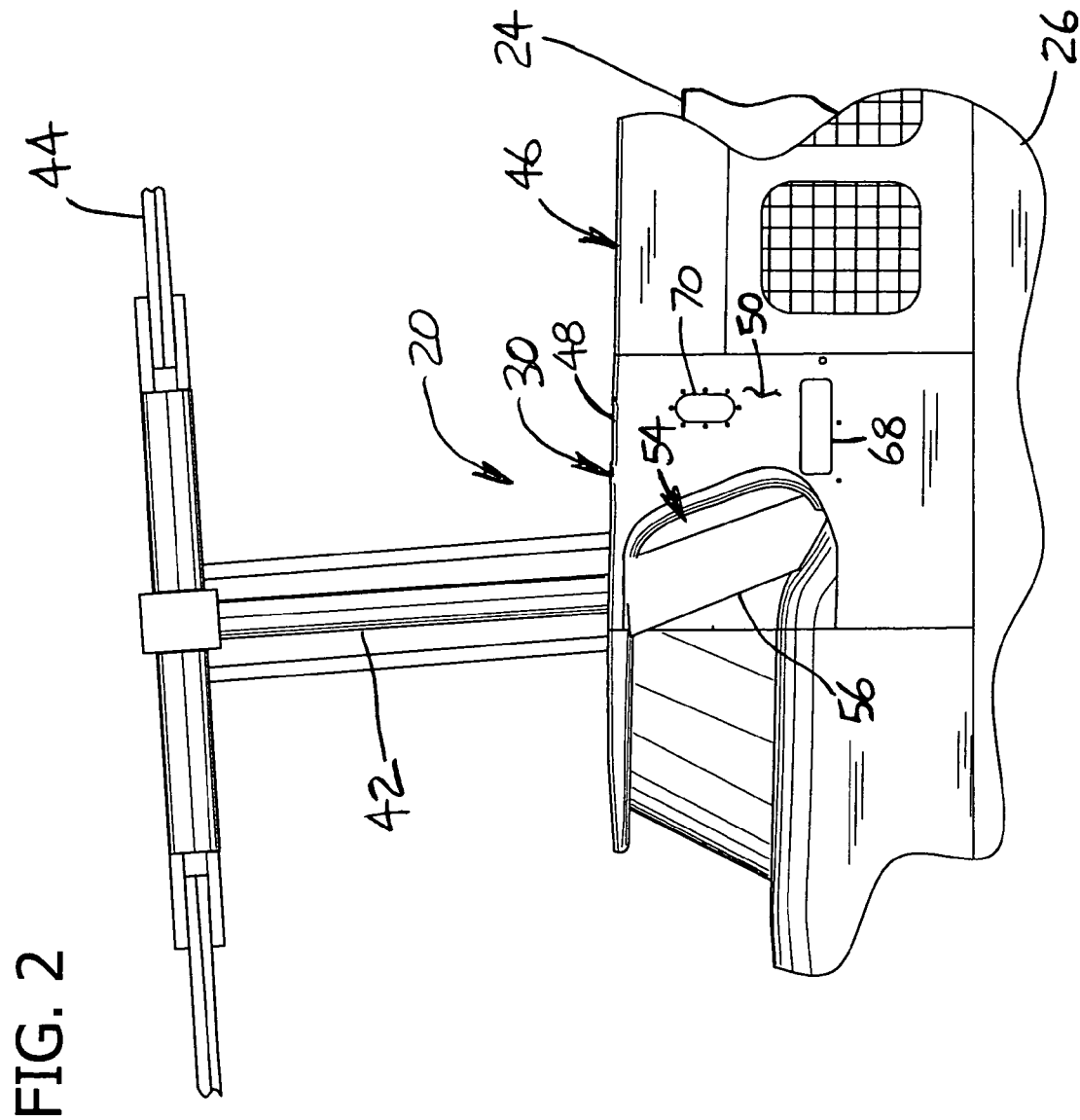
FIG. 2 is an enlarged fragment of FIG. 1.

Referring now to the drawings and in particular to FIGS. 1-4, an air induction system of the present invention is designated generally by 20. The system 20 includes two barrier filter panels 22, 23 for protecting an engine 24 from ingestion of contaminant particles. The system is primarily intended for use with a gas turbine engine which is installed in an aircraft such as a helicopter 26, more particularly as shown a Bell 206B helicopter. However, it is understood that the system can be used with other types of engines or equipment, or may be installed at a factory or on a portable maintenance cart, without departing from the scope of this invention.

The air induction system 20 includes a cowling, generally designated 30, and a filtering unit, indicated in its entirety at 40. The filtering unit is generally enclosed within the cowling. The system receives intake air, removes contaminants from the intake air, and channels intake air to the engine 24 for ingestion by the engine. The cowling 30 comprises a body with a hollow interior defining an internal passage for conveying intake air toward the engine. In the embodiment shown in FIGS. 1 and 2, the cowling 30 is positioned along the top of the fuselage of helicopter 26, immediately aft of a mast 42 of rotor 44. The cowling 30 forms a portion of a fairing, indicated generally at 46 (FIG. 1), which covers the propulsion system and provides a generally smooth and aerodynamic external contour along the upper section of the helicopter 26. The cowling 30 has an upper surface 48 and opposite left and right outer sides 50. The shape and size of the cowling may be selected to fit the particular installation for a favorable mechanical and aerodynamic integration, and alternate shapes or configurations do not depart from the scope of this invention.

Figure 3:
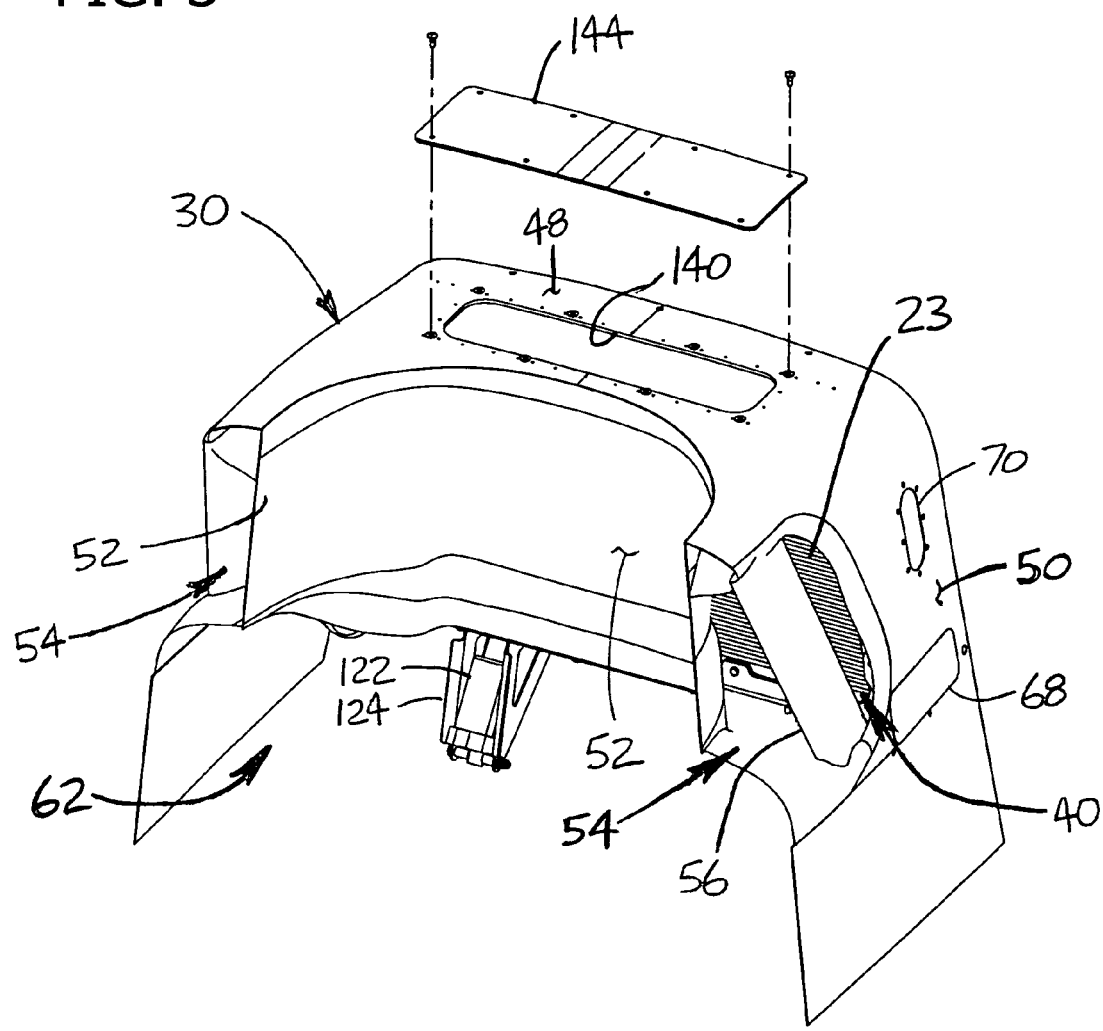
FIG. 3 is a front perspective of the air induction system including a cowling and cover (shown removed)
Figure 4:
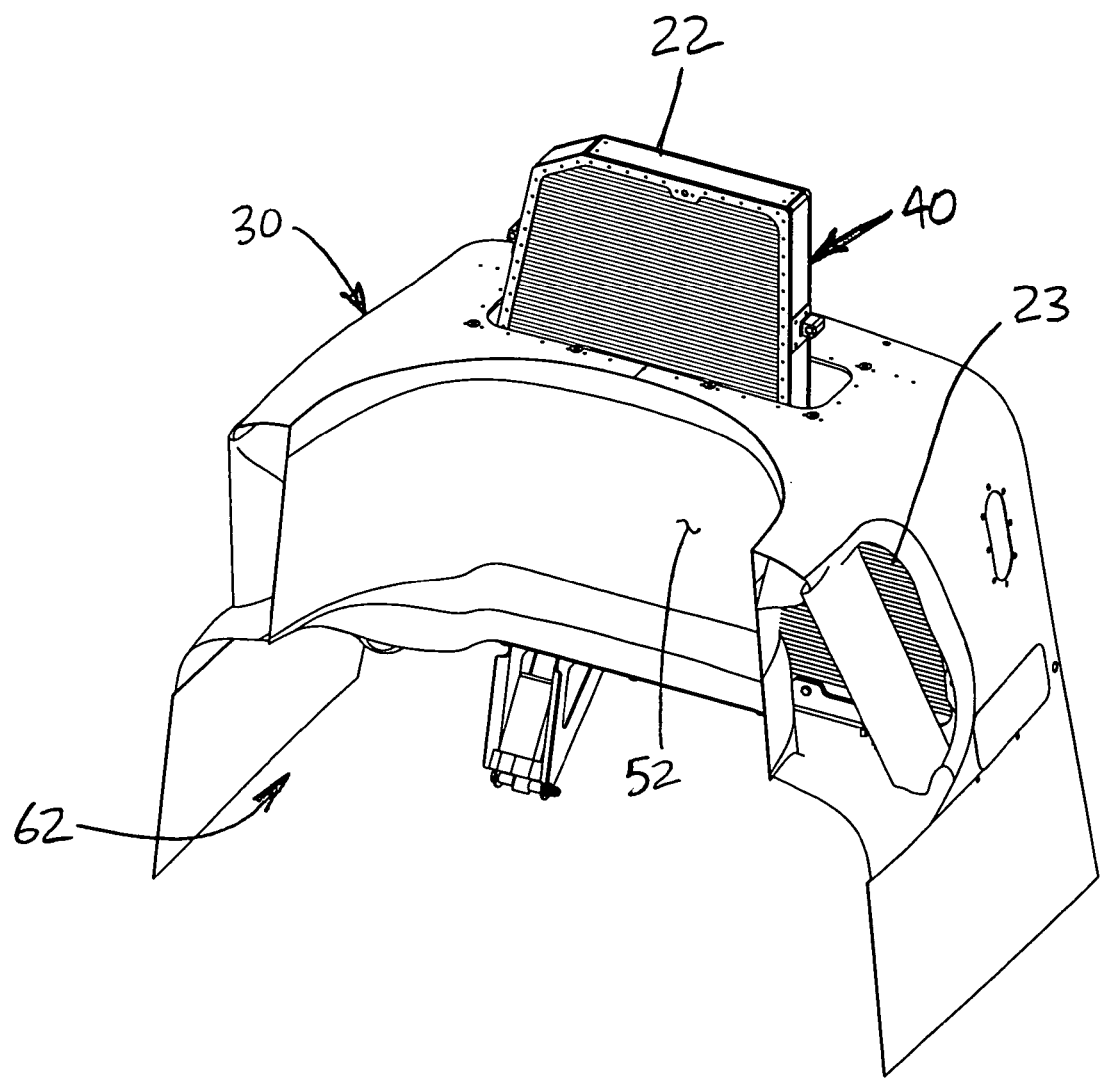
FIG. 4 is a view similar to FIG. 3 showing a barrier filter panel as it is being moved through an opening in the cowling for installation or removal.

As best shown in FIGS. 3 and 4, this embodiment has a front end of cowling 30 with a wall 52 having an arcuate shape (e.g., generally semi-circular) defining a concave recess sized for providing a clearance region around the rotor mast 42 (FIG. 1). Left and right entryways 54 for receiving intake air into the cowling 30 each comprise an opening in a corresponding side 50. Each entryway 54 is located in an upper portion of the front of the cowling, and intake air received into the entryways passes into an upper portion of the interior of the cowling 30. Each entryway 54 faces in a generally forward direction, extending laterally from the side 50 to the front wall 52, for receiving air with improved ram pressure when the helicopter 26 has forward motion. A slanted guide vane 56 is mounted in each entryway 54. It is understood that other configurations of entryways, including a different number, arrangement, and/or locations on the helicopter, do not depart from the scope of this invention.

Figure 5:
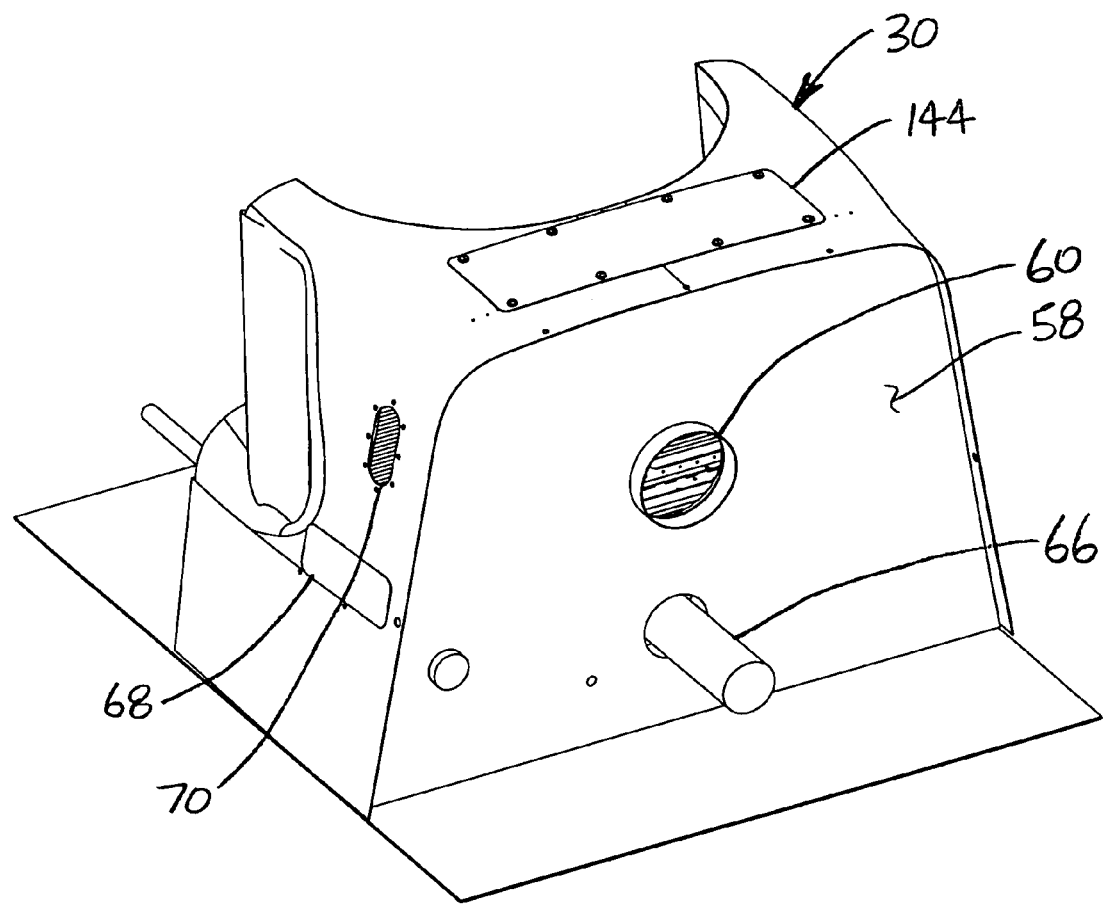
FIG. 5 is a rear perspective of the air induction system.

As shown in FIG. 5, a back end of the interior of the cowling 30 has a separating wall 58, known to those skilled in the art as a firewall. Intake air exits from the interior of the cowling through an opening 60 in the firewall 58. The exit opening 60 and cowling 30 are positioned such that, when installed in the helicopter 26, the opening is adjacent a front of the engine so that intake air may flow directly from the cowling into the engine. In the embodiment shown in the drawings, there is a single opening 60 which is circular in shape and positioned centrally in the firewall 58. Other configurations do not depart from the scope of this invention.

Figure 6:
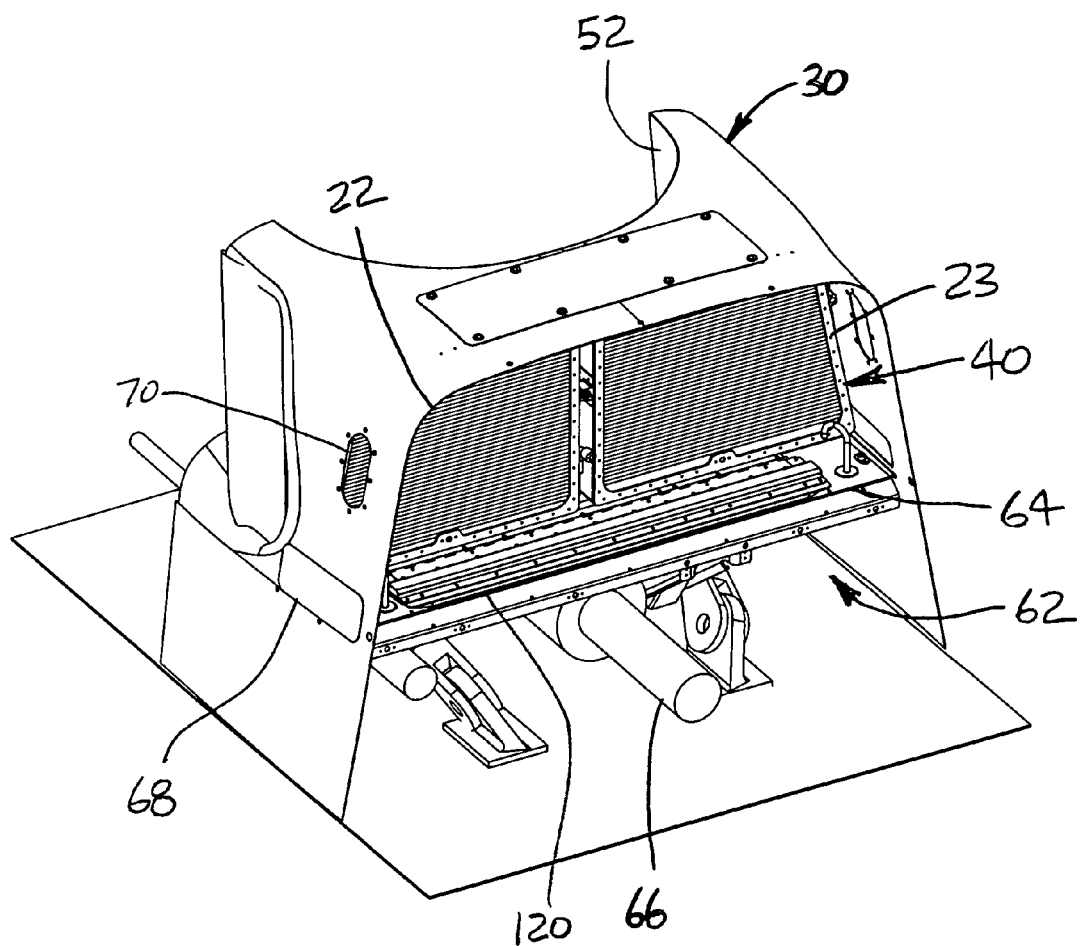
FIG. 6 is a view similar to FIG. 5 with a firewall being removed to show components of the system.

Referring to FIG. 6 wherein the firewall 58 is removed, a lower portion of the interior of the cowling 30 is hollow and defines an enclosure known to those skilled in the art as a transmission bay 62. A floor panel 64 (FIG. 6) is mounted in the interior of the cowling 30 where it divides upper and lower portions of the interior and segregates intake air which is flowing toward the engine in the upper portion, from air in the transmission bay 62 which is in the lower portion and generally not flowing. The floor panel 64 has side flanges 65 which are fastened to the interior of the cowling. Air may enter the transmission bay 62 from within the clearance region around the mast 42, i.e., generally in front of wall 52. A drive shaft 66 (FIG. 6) is located beneath the floor 64 in the transmission bay 62 for transmitting power from the engine to the rotor 44.

Cover plates 68 are attached on the left and right outer sides 50 of the cowling 30 in order to seal openings which are unneeded with the present invention. These openings may have been previously used as ejectors for a contaminant removal system of the prior art (e.g., an inertial air particle separator). Conventional windows 70 on sides 50 of the cowling are transparent for permitting visual inspection of the region directly in front of the engine.

Figure 10:
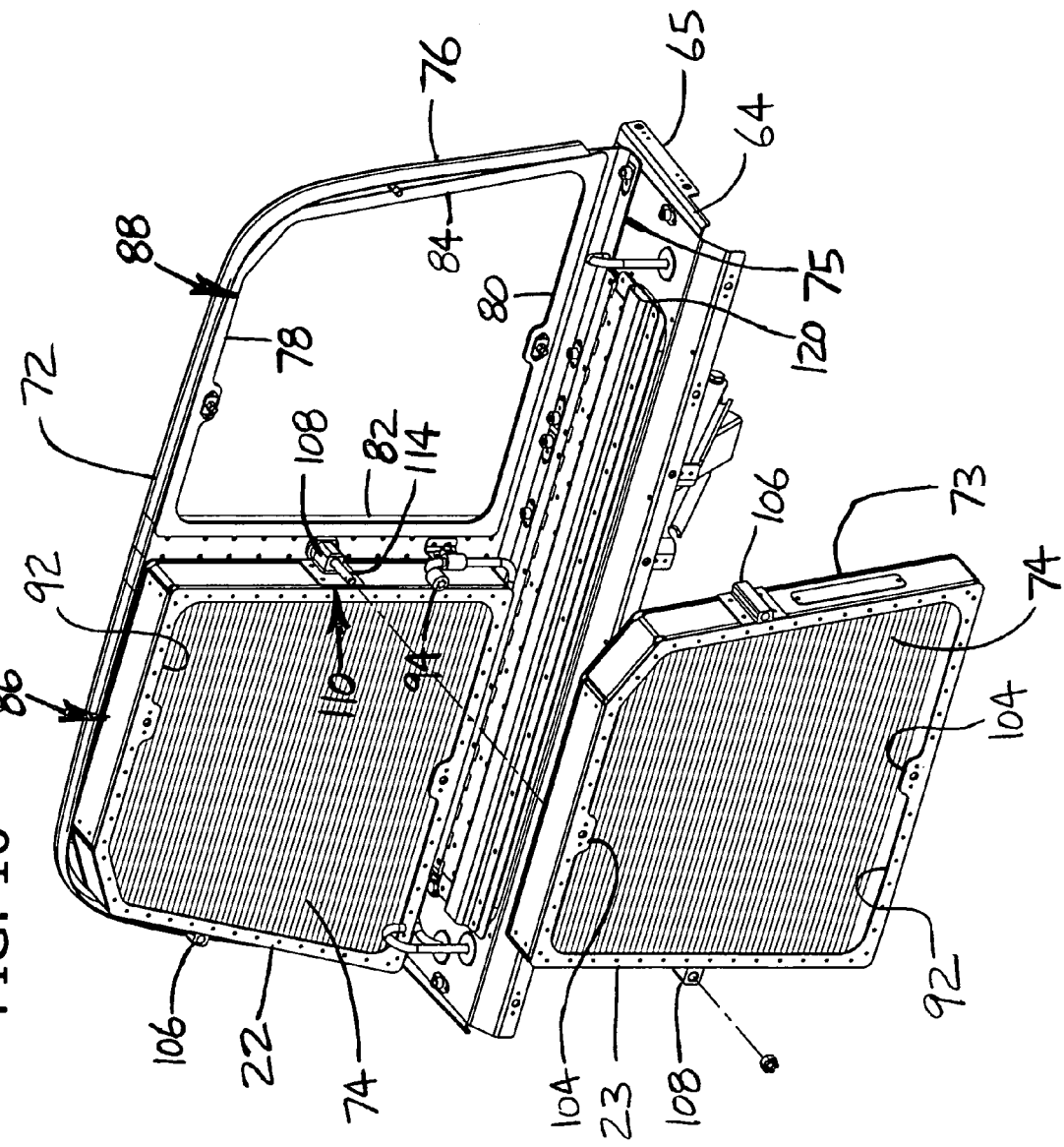
FIG. 10 is an upper perspective of the filtering unit with one filter panel being removed.

As shown in FIG. 10, the filtering unit 40 includes a mounting frame 72 and the two barrier filter panels 22, 23. The mounting frame 72 is adapted for securing the filter panels 22, 23 in the interior of the cowling 30 and providing a generally airtight seal so that all intake air must flow through the filter panels. Each filter panel has opposite first and second faces 73, 74 which, when installed in the cowling, are oriented to face either toward an upstream direction or a downstream direction with respect to flow of air in the cowling.

The mounting frame 72 is attached to the floor 64 in an upright orientation by fasteners received through a bottom flange 75 (FIG. 10). An external shape of the mounting frame 72 is adapted to closely fit the interior surface of the cowling 30. In the embodiment shown in the drawings, the mounting frame has a generally trapezoidal external shape with curved corner regions. A seal 76 extends along the outer edge of the mounting frame 72 for providing an airtight seal against the interior surface of the cowling 30. The mounting frame comprises an upper segment 78, a lower segment 80, a central vertical segment 82, and left and right side segments 84. First and second filter mounting locations, indicated generally at 86 and 88, respectively, are each defined by four segments 78, 80, 82, 84 bounding an opening in the mounting frame 72. Other configurations and arrangements do not depart from the scope of this invention.

In the embodiment shown in the drawings, the filter panels 22, 23 are mounted to a face of the mounting frame 72 which is downstream with respect to the flow of intake air in the cowling 30. The first filter panel 22 is attachable to the mounting frame at the first mounting location 86, and the second filter panel 23 is attachable to the mounting frame at the second location 88. The first and second mounting locations 86, 88 of the mounting frame are arranged in a close, lateral relation such that the first and second filter panels 22, 23 are in lateral, side-by-side arrangement. It is understood that other arrangements, including configurations which are not adjacent or not in lateral relation, do not depart from the scope of this invention.

Each filter panel 22, 23 includes a pleated, porous barrier filter element mounted in a retention frame 92 which securely retains the filter element in place. The retention frame 92 defines a rim extending around the filter element, and has a channel-shaped cross section with side flanges which engage the mounting frame 72 with generally airtight seals therebetween. Sealing ensures that all intake air must pass through a filter element to reach the engine. An exemplary material for the retention frame 92 is aluminum, although other materials may be used. The filter element is held in place in the retention frame by a suitable adhesive or physical connection, such as by a polymeric material such as polysulphite or polyurethane, or by an epoxy. The polymeric material functions as a sealant to seal the perimeter (i.e., side edges) of the filter element, structurally adhering it to the retention frame 92 and preventing unfiltered air from passing between the retention frame and the filter element. Each filter panel is constructed such that if it should become obstructed with contaminants, maintenance personnel can remove it and clean the barrier filter media.

Pleating of the barrier filter element effectively increases the surface area and rigidity of the filter element. The filter element is effective at separating contaminants from the air and provides a low pressure drop characteristic across the filter. The filter element is constructed of filter media capable of achieving high particle removal efficiencies. The filter media is made of a lightweight material that will also be resistant to damage by water and other liquids it may encounter in operation. Preferred filter media includes woven cotton or polyester or a felt. When cotton is employed as the filter media, the filter media is preferably a cotton grid fabric comprised of a plurality of overlapping layers of woven cotton material. Preferably, the number of layers is in the range of from 3 to 6. The filter media may be strengthened by a stainless steel screen (not shown) which lines the filter media. To improve the filter efficiency for finer particles, the filter media may be impregnated with oil. The oil improves particle removal and helps resist moisture absorption by the filter media to render it substantially waterproof. It is understood that contaminant separators of various other configurations, such as non-pleated filters, filters formed with a different construction, and non-filtering inertial particle separators, do not depart from the scope of this invention. A conventional water wash nozzle 94 (FIG. 7) is provided for spraying the front of the engine with a spray of water.

For secure attachment to the mounting frame 72 and effective sealing, each filter panel 22, 23 is fastened to the mounting frame by fasteners positioned along the rim 92. In one embodiment, each of four sides of the barrier filter is fastened to the mounting frame 72 by one fastener. It is understood that a fewer or greater number of attachments may be used without departing from the scope of this invention. Each of the upper and lower segments of the rim has a fastening tab 104 (FIG. 10) on the side of the retention frame. Each tab has a hole for receiving a fastener to connect to the mounting frame. A similar tab 104 is located on each of the upper and lower segments on the opposite face of the filter panel. The outer lateral segment of the rim 92 has an outer lug 106 (FIG. 10) for receiving a fastener such as a pin. The inner lateral segment of the rim 92 has an inner lug 108.

The first and second filter panels 22, 23 are interchangeable. They are substantially identical in shape and size, and configured to be removed and reversed in orientation for mounting at an opposite mounting location. Each filter panel is attachable to the mounting frame 72 at either of the first or second mounting location 86, 88 by proper orienting of the filter. The first filter panel 22 is attachable at the first mounting location 86 with its first face 73 facing toward an upstream direction in the passage and its second face 74 facing toward a downstream direction, and is attachable at the second mounting location 88 in a reversed orientation with its first face facing toward a downstream direction in the passage. Similarly, the second filter panel 23 is attachable at the second mounting location 88 with its first face 73 facing toward the upstream direction in the passage and attachable at the first mounting location 86 with its first face facing toward the downstream direction in the passage. The filter media is bi-directional and effectively removes contaminants with flow therethrough in either orientation. The interchangeability eliminates the need for maintaining inventory of left and right hand specific parts.

Figure 11:
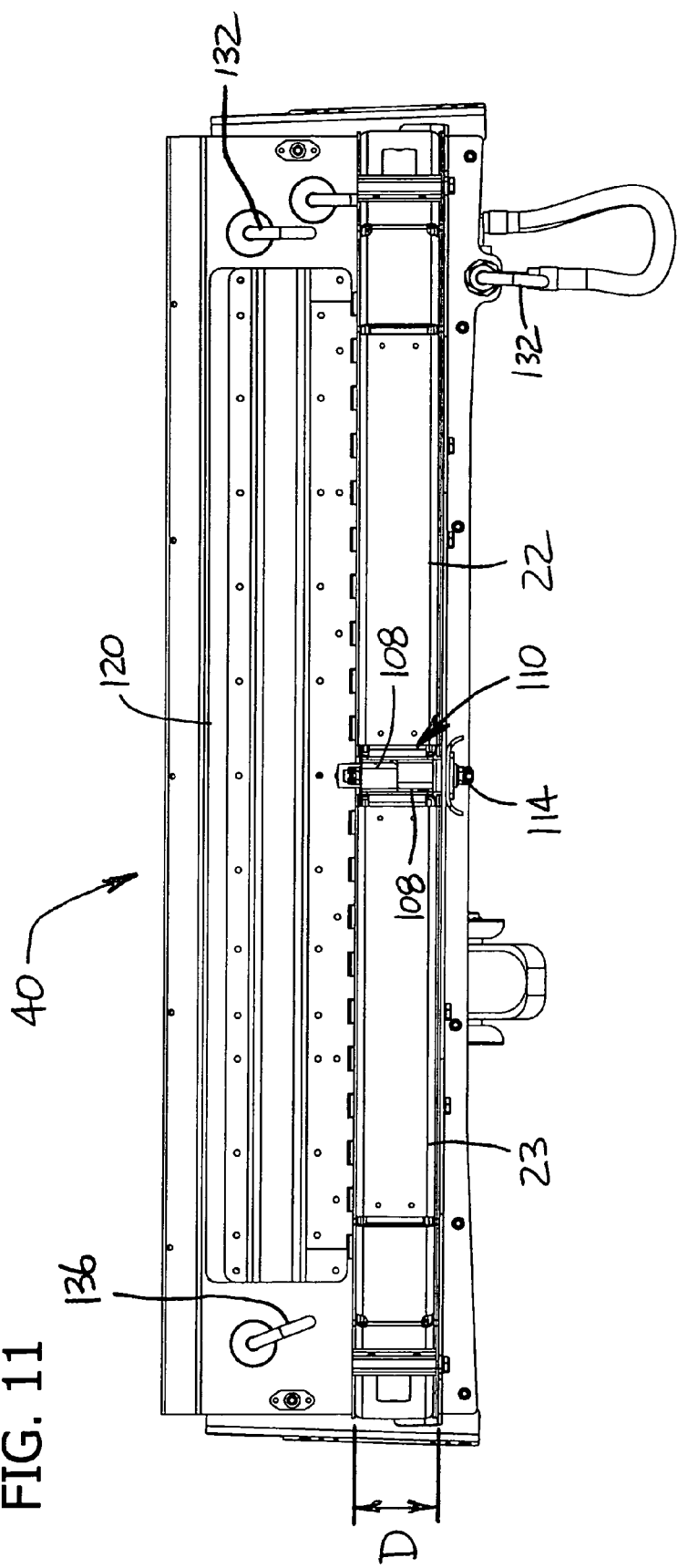
FIG. 11 is a top plan of the filtering unit.

A connecting juncture, indicated generally at 110, is defined by the laterally inner rim segments of the first and second filter panels 22, 23 and the central vertical segment 82 of the mounting frame 72. The juncture 110 includes the inner lug 108 (a first inner lug) on the first filter panel 22 and the inner lug 108 (a second inner lug) on the second filter panel 23. Each inner lug 108 extends from a corresponding rim 92, and has an opening for receiving a fastener 114 (FIG. 10). Significantly, the inner lugs 108 each have a depth less than a depth of the filter panel, such that the lugs may be axially aligned and engaged (or "stacked") in a generally horizontal arrangement. The inner lug 108 of the first filter panel 22 is positioned toward and generally flush with the upstream face of the first filter panel when mounted at the first position 86. Similarly, the inner lug 108 of the second filter panel 23 is positioned toward and generally flush with the downstream face of the second filter panel when mounted at the second position 88. As shown in FIG. 11, each filter panel 22, 23 has a generally uniform depth D and the inner lugs 108 each have a depth about one-half of D. In combination, the inner lugs 108 do not project beyond the depth of the filter panels. When the filter panels 22, 23 are at the first and second mounting positions, the two inner lugs 108 are in engagement and horizontally stacked. Further, the openings therein are axially aligned for receiving a common fastener 114 through both lugs. That assures correct relative placement of the filter panels, as well as minimizes the number of fasteners handled when installing or removing a filter panel. As shown in FIG. 11, the outer lugs 106 each have a depth about equal to D. Other arrangements and relative dimensions do not depart from the scope of this invention.

As shown in FIGS. 10 and 11, the inner lugs 108 are arranged such that the filter panels 22, 23 are interchangeable. When at the first mounting position 86, the inner lug 108 of the first filter panel 22 is positioned toward the upstream side of the filtering unit 40. When reversed for placement at the second mounting position 88, the inner lug is positioned toward the downstream side of the filtering unit.

As discussed above, the first and second mounting locations 86, 88 of the mounting frame are arranged close together to minimize space between the first and second filter panels 22, 23. The juncture 110 should be as small as possible to reduce the obstruction to the flow of intake air through the filtering unit 40. Because the filter panels are closely spaced, filtering area is maximized for inhibiting loss of intake air pressure as it flows through the cowling.

Significantly, the juncture 110 is located at a region of relatively low quantity intake air flow. The passage of the air induction system 20 requires the intake air to turn as it flows through the interior of the cowling 30, and produces a distribution of intake air flow which is non-uniform across the passage. As intake air flows into the cowling 30, inertia causes it to tend to travel in a straight line directly downstream from the entryways 54. For the embodiment shown in the drawings, the entryways 54 are laterally spaced, with no entryway at the center. Intake air tends to remain laterally spaced as it approaches the filtering unit 40. Consequently, the center of the filtering unit 40 (i.e., at the juncture 110) receives relatively less intake air than the outer regions. Placement of the juncture 110 at the center minimizes adverse effects of the flow obstruction. However, it is understood that other configurations and passage arrangements with different distributions of intake flow do not depart from the scope of this invention.

Figure 7:
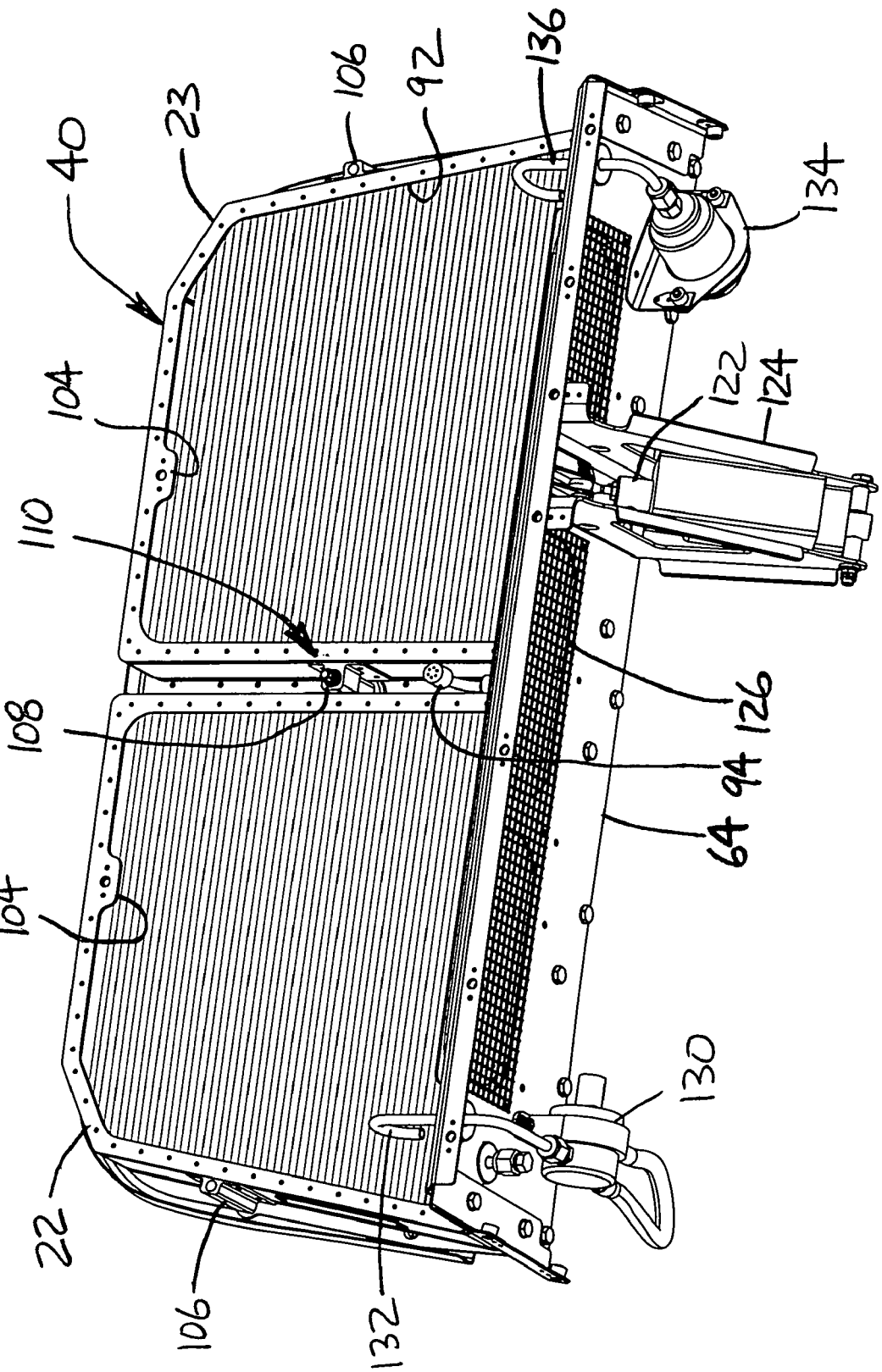
FIG. 7 is a lower perspective of a filtering unit of the air induction system.
Figure 8:
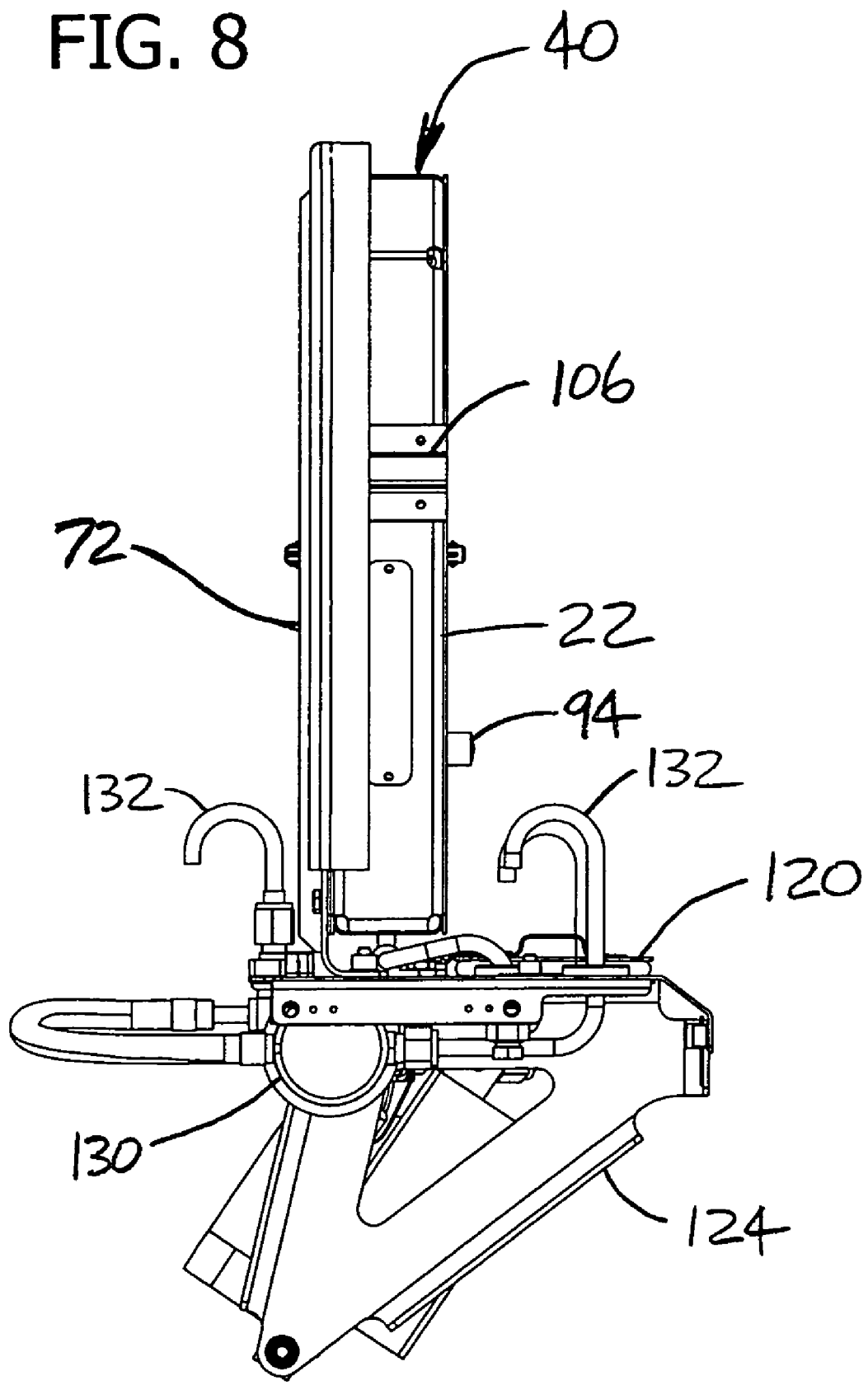
FIG. 8 is a side elevation of the filtering unit.
Figure 9:
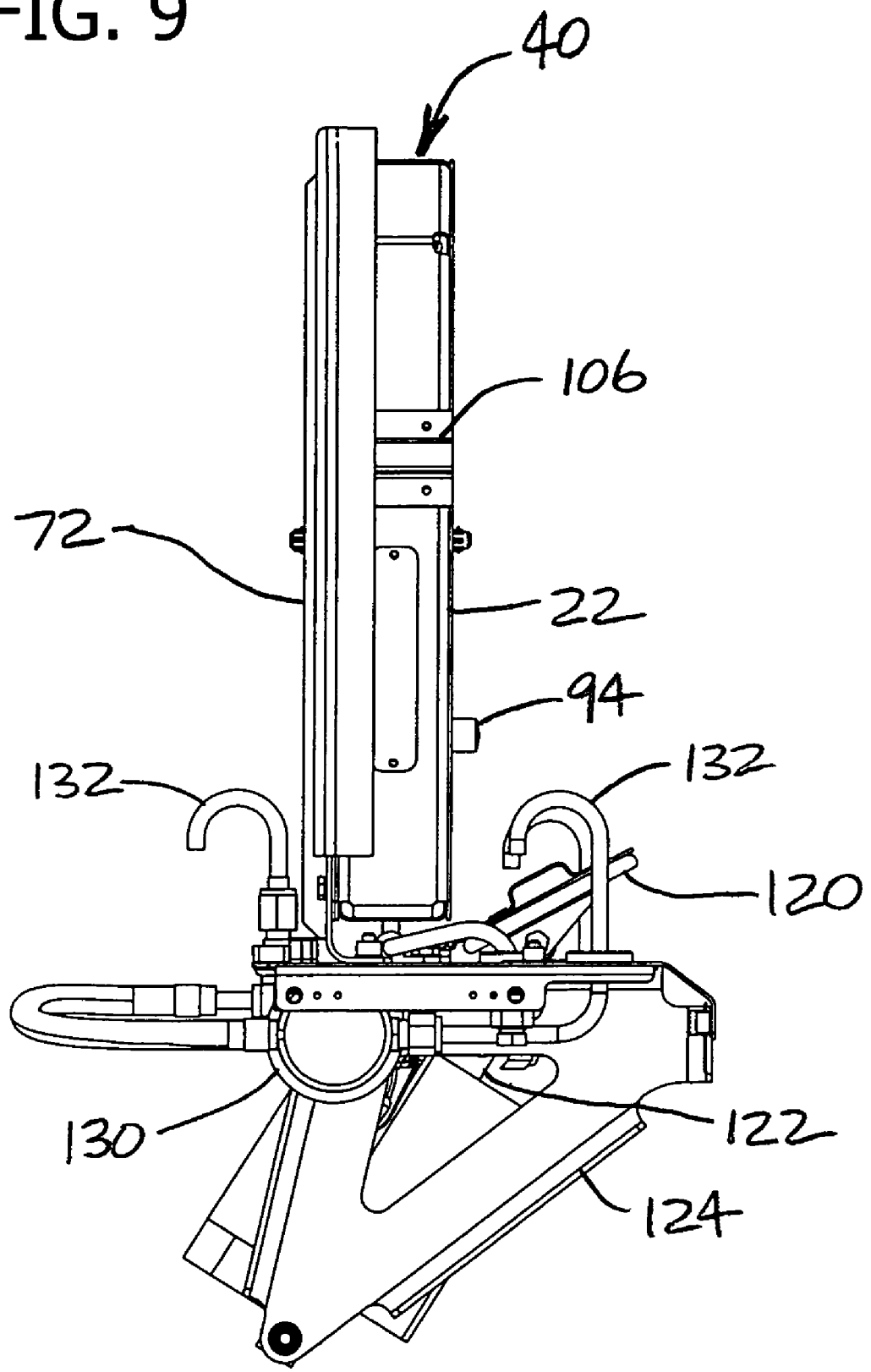
FIG. 9 is a view similar to FIG. 8 with a bypass door swung to an open position.

Referring to FIGS. 7-9, the floor panel 64 has one or more bypass openings for enhancing safety. A door 120 covers the opening and is movable between a closed position (FIG. 8) wherein all intake air in the passage is directed through the filter panels 22, 23, and an open position (FIG. 9) wherein air in the transmission bay 62 beneath the floor 64 may flow through the bypass opening thereby bypassing the filter panels. The bypass door 120 is hingedly attached to the floor panel 64, and is opened and closed by an electromechanical actuator 122 controlled by a pilot-operated switch (not shown). The actuator 122 (FIGS. 7 and 9) is mounted on a bracket 124 projecting downward from the floor panel 64. A porous screen 126 (FIG. 7) covers the opening.

Thus, the filtering unit 40 comprises an assembly for providing both filtering and bypass capabilities, and that assembly may be handled, shipped, and installed as one part. In the event that the barrier filters 22, 23 become significantly obstructed, a differential pressure sensor 130 (FIG. 7) causes a warning light to illuminate in the cockpit. The light alerts the pilot so that, if desired, the pilot may open the bypass door 120 to ensure that the engine continues to operate with an adequate quantity of air. The pressure sensor 130 is connected to tubes 132 in communication with regions upstream and downstream of the filtering unit 40 (FIG. 8). A conventional maintenance indicator 134 with tube 136 is provided for indicating to maintenance personnel the need for cleaning or replacing the filter panels 22, 23. It is understood that other configurations for bypass, or a system with no bypass capability, do not depart from the scope of this invention.

The cowling 30 has an opening 140 (FIG. 3) for installation or removal of the barrier filter panels 22, 23. Significantly, the opening 140 is positioned above the filtering unit 40 to permit "drop in" installation of filter panels from the upper surface 48 of the helicopter 26. The opening 140 is readily accessible. There is no longer any need to remove the cowling from the helicopter and/or disrupt surrounding aircraft systems. There is no required disassembly or re-assembly of various parts, thereby resulting in more efficient maintenance actions. The opening 140 also provides advantages over installation of a very large access door (needed for contaminant separators of the prior art) which can be impractical and may interfere with surrounding aircraft subsystems. A person may reach into the opening 140 to manually attach or detach the fasteners connecting the filter panels 22, 23 to the mounting frame 72. The opening 140 is located generally at a lateral center of the cowling 30, in a portion of the cowling which is generally flat and suitable for effective sealing. Further, no aircraft subsystems are located in the top of the cowling, precluding the need for disrupting another system to gain access to the filters. The opening is sized with a width greater than a maximum width of one of the barrier filter panels 22, 23, thereby permitting a filter panel to pass through for installation or removal, as shown in FIG. 4. A removable and sealable cover 144 (FIG. 3) is provided.

In operation, the air induction system 20 of the present invention is highly effective in removing contaminants while providing for quick and easy servicing. In use, it takes about 10 minutes to remove and replace filter panels through the opening 140, versus about one hour or more to perform maintenance on some systems of the prior art. The filtering unit 40 may be installed and used in an aircraft designed for a different system with no adverse changes to an existing airframe or engine. Thus, a helicopter having a panel of inertial particle separators may be retro-fitted with the improved system according to the present invention for removing contaminants from intake air without any substantial change to components of the helicopter.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. A filtering unit which is configured for placement in a passage of an engine air induction system to receive intake air and remove contaminants from the intake air, the filtering unit comprising:
   a mounting frame securable in said passage, the mounting frame defining first and second mounting locations;
   a first barrier filter panel attachable to the mounting frame at the first mounting location, the first filter having a porous filter media; and
   a second barrier filter panel attachable to the mounting frame at the second location, the second filter having a porous filter media;
   wherein the first and second filter panels are interchangeably usable, the filter panels being substantially identical in shape and size such that each is attachable to the mounting frame at either of the first or second mounting location.

2. A filtering unit as set forth in claim 1 wherein each of the first and second filter panels are mirror images of one another and configured to be reversed in orientation when interchangeably mounted at an opposite mounting location, such that the first filter panel is attachable at the first mounting location with its first face facing toward an upstream direction in the passage and further attachable at the second mounting location with its first face facing toward a downstream direction in the passage, and similarly the second filter panel is attachable at the second mounting location with its first face facing toward the upstream direction in the passage and attachable at the first mounting location with its first face facing toward the downstream direction in the passage.

3. A filtering unit as set forth in claim 2 wherein the first and second mounting locations of the mounting frame are arranged in lateral relation such that the first and second filter panels are in lateral, generally side-by-side positions.

4. A filtering unit as set forth in claim 2 wherein each filter panel further comprises a retention frame extending along an outer periphery of the filter media defining a rim of the filter panel, and wherein each of the first and second filter panels are attached to the mounting frame by at least two fasteners located along the rim.

5. A filtering unit as set forth in claim 2 wherein said passage of the air induction system produces a distribution of intake air flow which is non-uniform across the passage, and further comprising a connecting juncture between the filter panels and the mounting frame, the juncture being located at a region in the passage of relatively low quantity intake air flow.

6. A filtering unit as set forth in claim 5 wherein the juncture further comprises a first inner lug on the first filter panel and a second inner lug on the second filter panel, the lugs being in engagement and horizontally aligned arrangement.

7. A filtering unit as set forth in claim 6 wherein each of the first and second filter panels have a generally uniform depth, and wherein the first and second inner lugs each have a depth no greater than about one-half of said filter depth such that the aligned lugs in combination do not project beyond the depth of the filter panels.

8. A filtering unit as set forth in claim 7 wherein, when the filter panels are at the first and second mounting positions, the first and second inner lugs are aligned in registration for receiving a common fastener.

9. A filtering unit as set forth in claim 8 wherein the first and second inner lugs are positioned toward respective upstream and downstream faces of the first and second filter panels.

10. A filtering unit as set forth in claim 2 wherein the air induction system further comprises a floor panel attached to the mounting frame, the floor panel including a bypass opening and a door movable between a closed position wherein all air is directed through the filter panels prior to delivery to the engine, and an open position wherein at least some air may flow through the bypass opening to thereby bypass the filter panels.

11. In combination, a filtering unit as set forth in claim 1 and a cowling which forms an enclosure, said enclosure defining a portion of said passage of the air induction system and enclosing the filtering unit.

12. The combination as set forth in claim 11 wherein the cowling has an opening for installation or removal of the filter panels and a removable cover for the opening.

13. The combination as set forth in claim 12 wherein the opening is above the filtering unit and is positioned generally at a lateral center of the cowling.

14. The combination as set forth in claim 13 wherein the opening is located within a generally flat portion of the cowling.

15. The combination as set forth in claim 12 wherein the opening has a width sized for passage of only one filter panel at a time to minimize interference with surrounding aircraft subsystems.

16. An engine air induction system to receive intake air and remove contaminants from the intake air, the air induction system comprising:
- a body having a hollow interior with an entryway for receiving intake air and comprising a passage for delivery of intake air toward said engine;
- a filtering unit positioned within said body such that intake air in the interior of the body flows therethrough, the filtering unit including:
- a mounting frame secured in the body and at least two barrier filter panels removably attached to the mounting frame; and
- wherein the body has an opening for installation or removal of the filter panels, the opening located generally above the filtering unit, and configured such that a person may reach through the opening and manually detach either of the filter panels from the mounting frame and remove the filter panel through the opening for maintenance or replacement, and then insert the filter panel through the opening and manually reach through the opening to attach the filter panel to the mounting frame.

17. An engine air induction system as set forth in claim 16 wherein the body comprises a cowling which forms a portion of an aircraft.

18. An engine air induction system as set forth in claim 16 wherein the opening has a width sized for passage of only one filter panel at a time to minimize interference with surrounding aircraft subsystems.

19. An engine air induction system as set forth in claim 16 wherein said two barrier filter panels are mountable in adjacent positions on the mounting frame.

20. An engine air induction system as set forth in claim 19 wherein said two barrier filter panels are substantially identical in shape and size and interchangeably usable.

21. An engine air induction system as set forth in claim 19 further comprising a connecting juncture between the filter panels and the mounting frame.

22. An engine air induction system as set forth in claim 21 wherein said passage of the body produces a distribution of intake air flow which is non-uniform across the passage, and wherein the juncture is located at a region in the passage of relatively lower quantity of intake air flow.

23. An engine air induction system as set forth in claim 21 wherein the juncture further comprises a first inner lug on a first filter panel and a second inner lug on a second filter panel, the lugs being in engagement and horizontally stacked arrangement.

24. An engine air induction system as set forth in claim 23 wherein each of the first and second filter panels have a generally uniform depth, and wherein the first and second inner lugs each have a depth no greater than about one-half of said filter depth such that the aligned lugs in combination do not project beyond the depth of the filters.

25. An engine air induction system as set forth in claim 24 wherein the first and second inner lugs are alignable in registration for receiving a common fastener.

\* \* \* \* \*